United States Patent [19]

Meissner et al.

[11] Patent Number: 5,618,032
[45] Date of Patent: Apr. 8, 1997

[54] SHAFT FURNACE FOR PRODUCTION OF IRON CARBIDE

[75] Inventors: David C. Meissner; Winston L. Tennies, both of Charlotte, N.C.

[73] Assignee: Midrex International B.V. Rotterdam, Zurich Branch, Zurich, Switzerland

[21] Appl. No.: 435,883

[22] Filed: May 5, 1995

Related U.S. Application Data

[63] Continuation-in-part of Ser. No. 237,786, May 4, 1994, Pat. No. 5,437,708.

[30] Foreign Application Priority Data

Mar. 15, 1995 [ID] Indonesia ............... 297CAL95

[51] Int. Cl.[6] ............................ C21B 13/02
[52] U.S. Cl. .................. 266/80; 75/384; 75/490; 266/81; 423/439
[58] Field of Search ............. 266/80, 81; 423/439; 75/384, 490

[56] References Cited

U.S. PATENT DOCUMENTS

| | | | |
|---|---|---|---|
| Re. 32,247 | 9/1986 | Stephens, Jr. ............... | 75/11 |
| 3,764,123 | 10/1973 | Beggs et al. ............... | 266/29 |
| 3,836,131 | 9/1974 | Beggs ............... | 266/20 |
| 3,844,766 | 10/1974 | Beggs ............... | 75/35 |
| 3,899,569 | 8/1975 | Hunter et al. ............... | 423/76 |
| 4,046,557 | 9/1977 | Beggs ............... | 75/35 |
| 4,053,301 | 10/1977 | Stephens, Jr. ............... | 75/11 |
| 4,111,687 | 9/1978 | Syska ............... | 75/13 |
| 4,160,663 | 7/1979 | Hsieh ............... | 75/35 |
| 4,212,452 | 7/1980 | Hsieh ............... | 266/156 |
| 4,248,623 | 2/1981 | Parst ............... | 75/35 |
| 4,396,423 | 8/1983 | Stephens, Jr. et al. ............... | 75/25 |
| 4,416,688 | 11/1983 | Greenwalt ............... | 75/6 |
| 5,061,326 | 10/1991 | Shoen ............... | 148/124 |
| 5,073,194 | 12/1991 | Stephens et al. ............... | 75/376 |
| 5,104,561 | 4/1992 | Kitamura et al. ............... | 252/62.51 |
| 5,118,479 | 6/1992 | Stephens, Jr. et al. ............... | 423/148 |
| 5,137,566 | 8/1992 | Stephens, Jr. et al. ............... | 75/507 |
| 5,139,568 | 8/1992 | Geiger ............... | 75/501 |
| 5,387,274 | 2/1995 | Dam et al. ............... | 75/495 |
| 5,437,708 | 8/1995 | Meissner et al. ............... | 266/140 |

*Primary Examiner*—Melvyn Andrews
*Attorney, Agent, or Firm*—Ralph H. Dogherty

[57] ABSTRACT

Apparatus for the production of iron carbide in a shaft furnace, by reacting a carbon containing reducing gas as the process gas with particulate metal oxide material for an extended residence time at low temperature, including residence time and operating temperature controls. The resulting iron carbide product is also disclosed.

18 Claims, 3 Drawing Sheets

SHAFT FURNACE FOR PRODUCTION OF IRON CARBIDE

CROSS REFERENCE TO RELATED APPLICATION

This application is a continuation-in-part of our U.S. patent application Ser. No. 08/237,786, filed May 4, 1994 now U.S. Pat. No. 5,437,708.

FIELD OF THE INVENTION

The present invention relates to a method and apparatus for the production of iron carbide in a shaft furnace, and more particularly to a method of using carbon containing reducing gas as the process gas in a furnace for reaction with particulate metal oxide material.

BACKGROUND OF THE INVENTION

Direct reduction of iron oxides captured steelmakers' imaginations several centuries ago when they first realized how easily oxygen could be removed from its iron ore carrier through reduction with hydrogen and/or carbon monoxides. However, harnessing the simple chemical reactions in large scale commercial production proved elusive. Then the Midrex direct reduction process was developed which combines the technology of the shaft furnace and the gas generator in an economic direct reduction system operating continuously and using gaseous reductants produced from natural gas. While a small amount of iron carbide has always been a byproduct of the Midrex direct reduction process it generally accounted for less than two percent of the product.

DESCRIPTION OF THE PRIOR ART

Applicants are aware of the following related U.S. Patents concerning either iron carbide production or shaft furnace operation.

| U.S. Pat. No. | Issue Date | Inventor | Title |
|---|---|---|---|
| Re. 32,247 | 09-16-1986 | Stephens | PROCESS FOR THE DIRECT PRODUCTION OF STEEL |
| 3,764,123 | 10-09-1973 | Beggs | METHOD AND APPARATUS FOR REDUCING IRON OXIDE TO METALLIC IRON |
| 3,844,766 | 10-29-1974 | Beggs | PROCESS FOR REDUCING IRON OXIDE TO METALLIC SPONGE IRON WITH LIQUID OR SOLID FUELS |
| 3,836,131 | 09-17-1974 | Beggs | APPARATUS FOR COOLING A MOVING BED OF SOLID, GAS PERMEABLE PARTICLES |
| 3,899,569 | 08-12-1975 | Hunter | PREPARATION OF HIGHLY PURE TITANIUM TETRACHLORIDE FROM ILMENITE SLAG |
| 4,046,557 | 09-06-1977 | Beggs | METHOD FOR PRODUCING METALLIC IRON PARTICLES |
| 4,053,301 | 10-11-1977 | Stephens | PROCESS FOR THE DIRECT PRODUCTION OF STEEL |
| 4,111,687 | 09-05-1978 | Syska | PROCESS FOR THE PRODUCTION OF INTERMEDIATE HOT METAL |
| 4,160,663 | 07-10-1979 | Hsieh | METHOD FOR THE DIRECT REDUCTION OF IRON ORE |
| 4,212,452 | 07-15-1980 | Hsieh | APPARATUS FOR THE DIRECT REDUCTION OF IRON ORE |
| 4,248,623 | 02-03-1981 | Papst | PROCESS FOR THE DIRECT REDUCTION OF IRON ORES |
| 4,396,423 | 08-02-1983 | Stephens | PROCESS FOR RECOVERING IRON AND ZINC FROM STEEL MAKING DUSTS |
| 4,416,688 | 11-22-1983 | Greenwalt | DIRECT REDUCTION OF ORES AND CONCENTRATION OF METALLIC VALUES |
| 5,061,326 | 10-29-1991 | Shoen | METHOD OF MAKING HIGH SILICON, LOW CARBON REGULAR GRAIN ORIENTED SILICON STEEL |
| 5,073,194 | 12-17-1991 | Stephens | PROCESS FOR CONTROLLING THE PRODUCT QUALITY IN THE CONVERSION OF REACTOR FEED INTO IRON CARBIDE |
| 5,104,561 | 04-14-1992 | Kitamura | PROCESS FOR PREPARING CARBIDE FINE PARTICLES |
| 5,118,479 | 06-02-1992 | Stephens | PROCESS FOR USING FLUIDIZED BED REACTOR |
| 5,137,566 | 08-11-1992 | Stephens | PROCESS FOR PREHEATING IRON-CONTAINING REACTOR FEED PRIOR TO BEING TREATED IN A FLUIDIZED BED REACTOR |
| 5,139,568 | 08-18-1992 | Geiger | CONTINUOUS PRODUCTION OF IRON-CARBON ALLOY USING IRON CARBIDE |

Stephens U.S. Re. Pat. No. 32,247 discloses a process for the production of iron carbide and then steel is an oxygen or electric furnace using a reducing and carburizing gas of $H_2$, $CH_4$, $CO$, and $CO_2$.

Beggs U.S. Pat. No. 3,764,123 discusses the reduction of metal oxide to metallic iron using reducing gas comprising CO and $H_2$ at a temperature of 1300° to 1450° F. (704° to 788°). The removed top gas is used as a portion of the reducing gas.

Beggs U.S. Pat. No. 3,844,766 teaches a method for the direct reduction of iron ore using liquid or solid fuels as the reductant source, and an associated gasifier.

Beggs U.S. Pat. No. 3,836,131 teaches means for introducing cooling gas into a furnace cooling zone.

Hunter U.S. Pat. No. 3,899,569 teaches the preparation of titanium tetrachloride from ilmenite slag.

Beggs U.S. Pat. No. 4,046,557 teaches a method of producing iron particles which reduces particulate material, with the spent reducing gas being removed and a portion of the spent reducing gas being introduced in a cooling zone and a portion of the cooling gas being introduced to the reducing zone.

Stephens U.S. Pat. No. 4,053,301 was reissued as U.S. Re. Pat. No. 32,247.

Syska U.S. Pat. No. 4,111,687 discusses the formation of 1 to 1.5 percent iron carbide by reducing metal oxide with a reducing gas of $H_2$ and CO mixed with recycled top gas.

Hsieh U.S. Pat. No. 4,160,663 discloses a process for the reduction of iron ore and shows a composition of reducing gas.

Hsieh U.S. Pat. No. 4,212,452 discloses a process for the reduction of iron ore and shows a composition of reducing gas.

Papst U.S. Pat. No. 4,248,623 teaches additional ways to introduce reducing gas into the furnace.

Stephens U.S. Pat. No. 4,396,423 discloses a process for recovering iron and zinc from steel making flue dust.

Greenwalt U.S. Pat. No. 4,416,688 teaches a process for beneficiating iron ore.

Shoen U.S. Pat. No. 5,061,326 teaches a method of making silicon steel.

Stephens U.S. Pat. No. 5,073,194 teaches process gases and reductants comprising $H_2O$, CO, $CO_2$, $H_2$, and $CH_4$.

Kitamura U.S. Pat. No. 5,104,561 discloses a process for preparing iron carbide fine particles and discloses various carburizing gases.

Stephens U.S. Pat. No. 5,118,479 teaches a design for a fluidized bed reactor and also discloses the five constituent process gases.

Stephens U.S. Pat. No. 5,137,566 teaches a process for the conversion of reactor feed material to iron carbide and discloses several process gas compositions.

Geiger U.S. Pat. No. 5,139,568 teaches a process for the production of an iron-carbon alloy.

SUMMARY OF THE INVENTION

The invention utilizes the Midrex method of direct reduction and further provides a method for using carbon-containing reducing gas as the process gas in a shaft furnace for the production of iron carbide. The Midrex method and apparatus for direct reduction is disclosed in U.S. Pat. No. 3,748,120 entitled "Method of Reducing Iron Oxide to Metallic Iron", U.S. Pat. No. 3,749,386 entitled "Method for Reducing Iron Oxides in a Gaseous Reduction Process", U.S. Pat. No. 3,764,123 entitled "Apparatus for Reducing Iron Oxide to Metallic Iron", U.S. Pat. No. 3,816,101 entitled "Method for Reducing Iron Oxides in a Gaseous Reduction Process", and U.S. Pat. No. 4,046,557 entitled "Method for Producing Metallic Iron Particles", which are hereby incorporated by reference. Applicants have invented an efficient process to produce iron carbide in a shaft furnace with no modification of the apparatus where the carbide carbon content is better than 5 to 6 percent. Carbon is added to the metallized product in the reducing zone as iron carbide derived from $CH_4$ and/or CO. The process gas, comprising CO, $CO_2$, $CH_4$, $H_2O$, and $H_2$ in specific proportions, is introduced into the furnace and flows upwardly through a downward gravitational flow of particulate metal oxide material. At a suitable temperature, the gas reacts with the metal oxide material to produce iron carbide and reaction gases. The metallized product is cooled by cooling gases introduced into the lower portion of the furnace. The reaction gases are removed from the top of the furnace and may be recycled and reintroduced into the furnace as reducing gas and/or cooling gas. The cooled, reduced metallized product is finally removed from the bottom of the furnace.

The removed reaction top gas is cooled, and a portion may be reintroduced into the furnace as a cooling gas, with the remainder being sent to a reformer for heating purposes or for recycling for reintroduction into the furnace as reducing gas. A portion of the cooling gas is removed from the furnace, but a portion is allowed to remain in the furnace to rise countercurrently through the metal oxide material and contribute to the reduction reactions. The portion of the cooling gas that is removed from the furnace is either cooled and reintroduced into the furnace as cooling gas or, in an alternative embodiment, is sent to the reformer for recycling and reintroduction into the furnace as reducing gas.

During normal operation of a shaft furnace utilizing the invented process, iron carbide is produced using the Midrex direct reduction process using the normal Midrex bustle gas, but the metal oxide material is maintained within the furnace at a lower temperature and contained within the furnace for a longer residence time than currently employed. Using the Midrex process gas in conjunction with the invented process, a product with 85% to 91% iron carbide ($Fe_3C$) is produced.

OBJECTS OF THE INVENTION

The principal object of the invention is to provide an improved apparatus for the production of a high percentage of iron carbide ($Fe_3C$) in the direct reduction of iron.

A further object of this invention is to provide an apparatus for production of iron carbide ($Fe_3C$) in a shaft furnace.

Another object of this invention is to provide an iron carbide product produced in a shaft furnace.

BRIEF DESCRIPTION OF THE DRAWINGS

The foregoing and other objects will become more readily apparent by referring to the following detailed description and the appended drawings in which.

DETAILED DESCRIPTION

Figure 1:
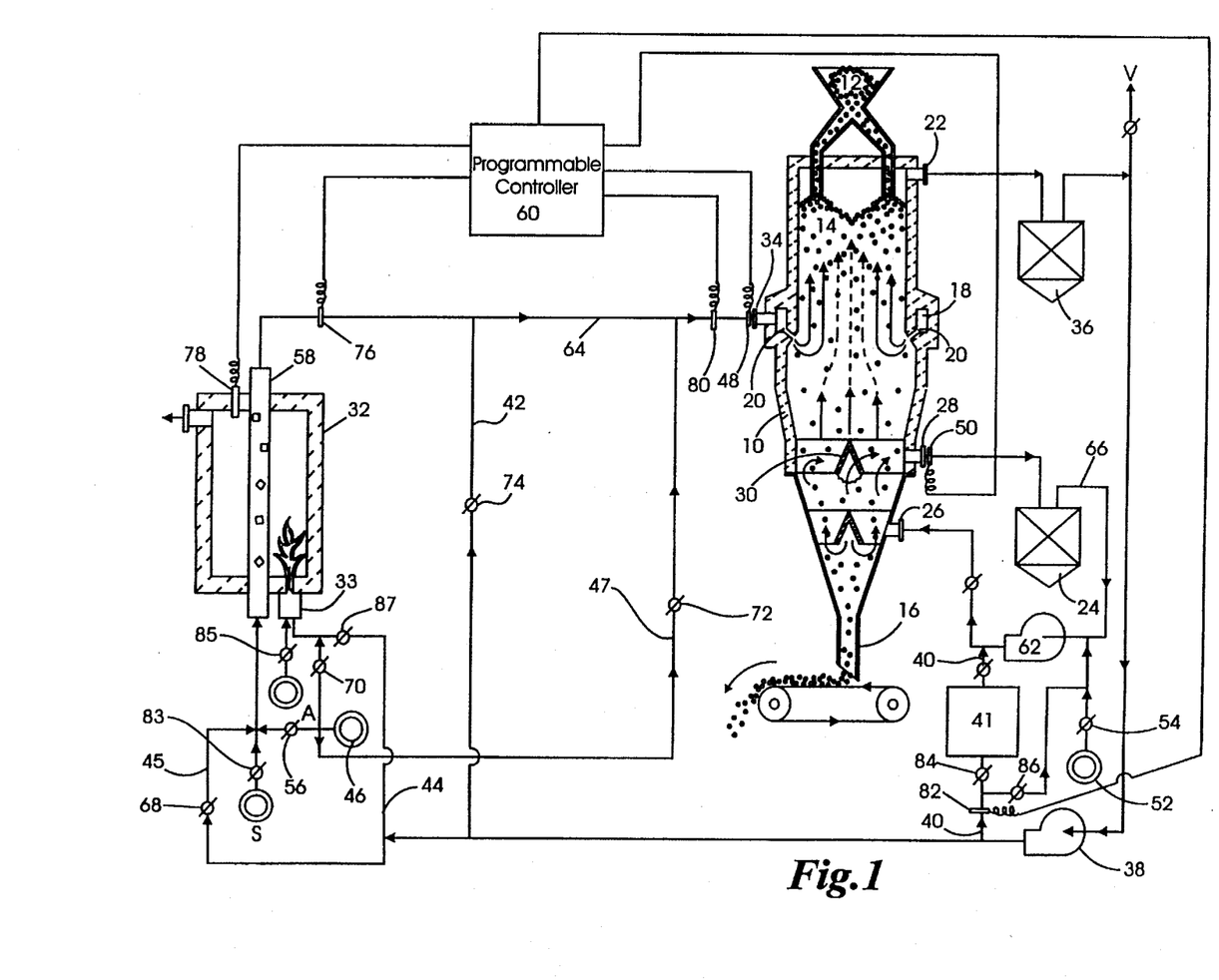
FIG. 1 is a schematic drawing of a vertical shaft furnace and its associated equipment for production of iron carbide in a shaft furnace.

Referring now to FIG. 1, the invention generally uses the Midrex direct reduction apparatus disclosed in U.S. Pat. No. 4,046,557, "Method for Producing Metallic Iron Particles", with several modifications. Particulate metal (iron) oxide material is charged to a vertical shaft furnace 10 at its upper periphery. The furnace 10 has an upper reducing zone, a lower cooling zone, and a discharge pipe 16. The removal of the product through the discharge pipe 16 establishes the gravitational downward flow of the metal oxide material to form a bed, or burden 14, in the furnace. A reformer 32 generates a hot reducing gas which is introduced into the furnace via inlet 34 into a bustle 18 and tuyere system 20 near the reducing zone and flows upwardly through the burden 14. A heating means heats the reducing zone of the furnace to a sufficient temperature to allow the reducing gas to react with the metal oxide material. These reactions reduce the metal oxide to iron carbide. Top gases are also formed by these reactions and are removed from the upper portion of the furnace by spent top gas offtake pipe 22.

A cooling gas is introduced into the furnace at the cooling zone of the furnace through inlet 26 to cool the reduced metallized product before removal of the product from the bottom 16 of the furnace. The reacted removed top gas is cooled and cleaned by a scrubber/cooler 36, passes through compressor 38, and a portion of this cooled top gas is reintroduced into the furnace as a cooling gas through pipe 40. A carbon dioxide removal apparatus 41 can be provided in line with pipe 40. After the cooling gas is injected into the furnace and passes upwardly through the burden, a portion of this gas is removed by a cooling gas collection member 30 and an outlet 28 at a location between the reducing and cooling zones. The portion of cooling gas that remains in the furnace flows upwardly and reacts with the metal oxide burden material to further facilitate carburization. The portion of the cooling gas that is removed from the furnace is passed through a scrubber/cooler 24 and is then reintroduced into the furnace as cooling gas through inlet 26.

Methane ($CH_4$) is added to the cooling gas from source 52 prior to its introduction into the cooling zone of the furnace. The cooling gas introduced through inlet 26 preferably contains approximately 20 to 50 percent $CH_4$ by volume. The amount of $CH_4$ added to the cooling gas from source 52 as well as the amount of methane added to the reducing gas from source 46 is regulated by a controlling means such as a programmable controller 60 which is operably associated with valves 54 and 56. Sensors 48 and 50 detect the amount of $CH_4$ present in the reducing gas and cooling gas, respectively, and valves 56 and 54 are adjusted to allow a proper, predetermined level of $CH_4$ into the furnace at the proper locations. Reducing gas may be enriched at inlet 34 by methane from line 47.

A reformer furnace 32 accepts hydrocarbon gas from source 46, a portion of the cooled top gas through pipes 44 and 45, and optionally steam from source S. The reformer outputs reducing gas in proper proportion into the furnace via inlet 34 at a predetermined temperature, preferably between 1150° and 1450° F. (621° to 788°).

Reformer burner 33 is fueled with cleaned recycled top gas from line 44, methane from source 46, and combustion air from source A.

If desired, cleaned, cooled top gas can bypass the reformer through line 42 for tempering the process gas at the inlet 34.

The temperature to which the reducing zone of the furnace is heated is approximately 1200° to about 1310° F. (about 650° to about 710° C.). Maximum conversion from iron oxide to iron carbide occurs around 1300° F. (704°) but falls off rapidly if the reducing zone temperature is increased to near normal reduction operating temperatures of around 1400° F. (760° C.). Current operating practice for direct reduction includes a residence time of the metal oxide burden material within the furnace of approximately 5 to 6 hours. To produce iron carbide in accordance with the present invention, burden residence time is from 9 to 15 hours with the preferred residence time being approximately 12 hours.

The bustle gas, or reducing gas, has five constituents which can interact either as gas/gas reactions or as gas/solid reactions. Some of these reactions liberate heat, i.e., are exothermic, and others consume heat, i.e., are endothermic. These reactable constituents are CO, $CO_2$, $CH_4$, $H_2$, and $H_2O$. The preferred proportions, by volume, of these constituents of the reducing gas are 36 percent CO, 5 percent $CO_2$, 4 percent $CH_4$, the balance being $H_2$ and a small amount of $H_2O$. Acceptable ranges for several of the reducing gas constituents include a CO content of not less than 30 percent, a $CO_2$ content of 2 to 5 percent, and a $CH_4$ content of 2 to 5 percent. Hot direct reduced iron pellets are a good catalyst for the various gas/gas reactions, as well as for the gas/solid carburizing reactions. The carburizing potential of the gas is a function of gas temperature and the partial pressures of the five constituent gases.

The following table illustrates how the carburizing potential is temperature dependent as well as how over 85 percent iron carbide ($Fe_3C$) in the product is achieved utilizing the invented process. The Table lists data from tests performed on metal oxide pellets which were maintained at the temperatures and durations as shown, while being exposed to a reducing gas comprising, by volume, 36 percent CO, 5 percent $CO_2$, 4 percent $CH_4$, the balance being $H_2$ and $H_2O$.

TABLE

| Temperature (°F.) | 1200 | 1250 | 1300 | 1350 | 1400 |
|---|---|---|---|---|---|
| Temperature (°C.) | 649 | 677 | 704 | 732 | 760 |
| Time (Hours) | 12 | 12 | 12 | 12 | 12 |
| Fe Total | 85.11 | 85.42 | 86.62 | 88.49 | 92.70 |
| Fe Metallic | 76.21 | 77.70 | 79.03 | 83.91 | 87.04 |
| % Metallization | 89.50 | 91.00 | 91.20 | 84.80 | 93.90 |
| % Total Carbon | 8.60 | 9.24 | 8.96 | 6.31 | 2.02 |
| % Graphite Carbon | 2.89 | 3.42 | 2.82 | 2.06 | 0.46 |
| % Carbide Carbon | 5.71 | 5.82 | 6.14 | 4.25 | 1.56 |
| % $Fe_3C$ | 85.42 | 87.06 | 91.85 | 63.58 | 23.34 |

Changes in the carburization of direct reduced iron affect the burden temperature. Carbon can be added to the reduced iron in the reducing zone as iron carbide derived from $CH_4$ and/or CO. Carbon from $CH_4$ is endothermic, while carbon from CO is exothermic. Therefore, an increase of $CH_4$ or $CO_2$ in the bustle area of the reduction furnace will reduce bed temperature. Conversely, a decrease in bustle $CH_4$ or $CO_2$ will raise bed temperature. When the burden temperature becomes too high, the material begins to agglomerate. However, a burden temperature that is too low will retard the rate of reduction and reduce furnace efficiency.

Several parameters affect product carburization. Decreasing the bustle, or reducing, gas temperature increases the carburizing potential and the amount of carbon in the reducing zone of the furnace. Carburizing potential increases as the temperature of the reducing gas decreases. The calculation is based on cooling the reducing gas from 1400° F. (760° C.) without considering methanation reactions in the equilibrium calculation. This is a valid assumption, particularly at lower temperatures, because of the considerably increased carburizing potential of carbon monoxide in the reducing gas as it cools. It should be noted that little carburizing will occur at temperatures below 932° F. (500° C.) because reaction kinetics are too slow.

Increasing the methane concentration in the reducing gas introduced into the furnace through inlet 34 and the bustle and tuyere system 18, 20 increases the carburizing potential in the reducing zone. As it cools the bed, this gas will react with the iron to form iron carbide. Experience has shown that a 0.1 percent increase in methane concentration of the bustle gas will increase the carbon content of the Midrex direct reduced iron product about 0.1 percent, at a constant production rate.

The addition of too much bustle $CH_4$ will cause the burden temperature to drop unacceptably low. As a result, metallization will drop unless the production rate is reduced. Depending on other parameters such as cooling zone gas upflow, the upper limit is probably about 4.5 to 5.0 percent $CH_4$ in the bustle gas before productivity is affected. Most plants operate at 2.5 to 3.5 percent bustle gas $CH_4$.

Lowering the bustle $CH_4$ content too severely can very rapidly overheat the bed and cause severe clustering. The lower safe operating limit is whatever enrichment will prevent methanation, perhaps as low as 2 percent. Reduction of the bustle $CH_4$ also causes product carbon to drop below the desired level. To protect the catalyst from carbon deposition, the amount of $CO_2$ in the reformed gas should not be permitted to drop below 2 percent.

There is a limit to the range of methane concentration in the bustle gas without adversely affecting the temperature of the bed. Therefore, it is necessary to employ a combination of control of bustle gas methane concentration and methane addition to the cooling zone via sensors 48 and 50 and valves 54 and 56 to regulate carburizing potential.

The introduction of methane, mixed with the cooling gas, into the cooling zone has an effect identical to that occurring in the reducing zone in the same temperature range. By adding methane to the cooling zone and allowing a controlled quantity of cooling gas to flow upwardly from the cooling zone, higher product carbon is obtained. When this gas flows upwardly through the top portion of the cooling zone, the gas becomes hotter, thus accelerating the carbon deposition reactions.

Depending on other parameters such as cooling zone upflow, cooling zone bleed, and enrichment, the cooling zone $CH_4$ may be as high as 50 percent. The cooling zone is a closed loop recirculating system. Any gas injected into the closed recirculating loop necessarily must force an equal volume of gas out of the loop at some other place. Therefore, if methane is injected into the loop, an equal amount of gas must leave the loop (e.g. at the cooling zone bleed or by upflow into the reducing zone). The gas analysis in a closed loop is determined by the percent of gas injected that is methane and the percent that is seal gas (e.g. if 50 SCFM methane and 50 SCFM seal gas are injected, the percent $CH_4$ is about 50 percent.) Lower limits of cooling zone $CH_4$ and carburizing gas $CH_4$ are set by the minimum acceptable amount of carbon in the product. Cooling zone methane is typically 20 to 50 percent, and carburizing gas methane is less than 10 percent.

Increasing the quality, or the $CO/CO_2$ ratio, in the gas in the reducing zone increases carbon from the Boudouard reaction. The ratio can be raised by increasing the quality of the gas exiting from the reformer 32. Thus, increasing the quality of the bustle gas increases its carburizing potential. The quality may be increased by lowering the reformed gas $CO_2$ content. Varying the quality is not normally used for carbon control because the capacity of the Midrex reformer varies inversely with the quality of reformed gas at a fixed methane leakage, and it is desirable to operate with maximum reformer capacity.

The $H_2/CO$ ratio of the reducing gas also affects the carburizing potential of the gas in the reducing zone of the furnace. Gases with high $H_2/CO$ ratios have lower carburizing potentials than those with low $H_2/CO$ ratios. This inhibition results from the combination of the water gas shift reaction $$(H_2O+CO \rightarrow CO_2+H_2)$$

and the Boudouard carbon reaction $$(2CO \rightarrow CO_2+C).$$

The additional water required to increase the $H_2/CO$ ratio maintains a $CO_2$ concentration that inhibits the formation of carbon.

The presence of water vapor in the cooling zone gas reduces carburizing potential in the cooling zone. Increasing the temperature of the cooling water to the cooling gas scrubber 24 in order to increase water vapor concentration very effectively reduces carbon. Water removes carbon in the cooling zone by the same mechanism that water inhibits carbon in the reformer $$(C+H_2O \rightarrow H_2+CO).$$

Another variable that affects product carbon is the type and size of iron oxide used. It is much easier to carburize some ores than others because of the specific physical and chemical properties of each raw material source. Factors such as pore size, surface area, and trace constituents of the particulate metal oxide material will also affect the degree of product carburization. Over 90 percent formation of iron carbide is achieved when the reducing zone temperature is maintained at from about 1200° to about 1310° F. (about 649° to 710° C.) and the process gas is used on Mutuca lump of a size ¼"×½" (0.64×1.27 cm) for 15 hours. Metal oxide material with larger lump sizes may require a longer residence time within the shaft furnace in order to achieve similar results.

The kinetics and equilibria of the carbon-depositing reactions are temperature dependent. Thus, each of the temperatures at the bustle, and the cooling zone or carburizing bustle, will affect product carburization.

The concentrations of each of the reactable constituents, i.e. $CO$, $CO_2$, $CH_4$, $H_2$, $H_2O$ and will affect the extent of the carbon-depositing reactions in the reducing, and cooling or carburizing zones. Given the burden temperature and the gas analyses, the water gas shift reaction directly or indirectly affects the relative concentrations of each of the reactable constituents.

The oxide feed, bustle temperature, $H_2/CO$ ratio, and reformed gas $CO_2$ are largely controlled by other plant operating criteria. The most effective carbon-controlling techniques currently practiced are to add controlled amounts of methane to the bustle gas and to the cooling zone or carburizing gas.

The iron carbide containing product of the present invention contains at least 50% iron carbide, but preferably from 60 to 93% $Fe_3C$.

ALTERNATIVE EMBODIMENTS

Figure 2:
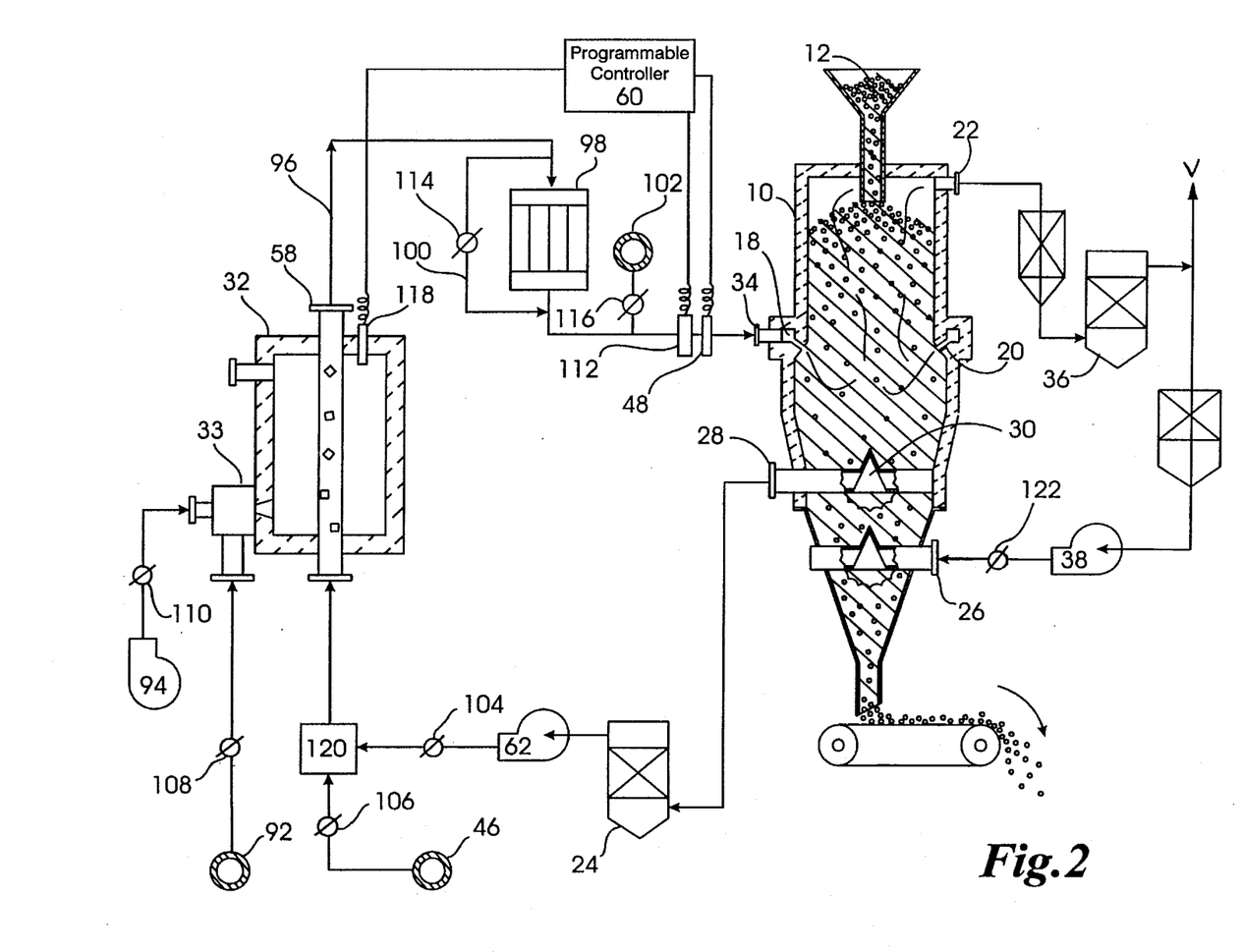
FIG. 2 is a schematic drawing of a vertical shaft furnace and its associated equipment for an alternative method of production of iron carbide in a shaft furnace.

An alternative method of iron carbide production is shown in FIG. 2. Cooling gas is introduced into the furnace through inlet 26. A portion of the cooling gas is removed from the furnace at outlet 28, cooled by scrubber/cooler 24 and then introduced to the reformer 32 for reforming into reducing gas for reintroduction into the shaft furnace through inlet 34.

Spent top gas is removed from the furnace via outlet 22 and is cooled and cleaned by scrubber/cooler 36. A portion of this cooled, cleaned removed top gas is then reintroduced into the furnace as cooling gas through inlet 26.

Apparatus for effectively carrying out this method of iron carbide ($Fe_3C$) production from particulate metal oxide material comprises a generally vertical shaft furnace 10, FIG. 1, having an upper reducing zone and a lower cooling zone. A means 12 for charging particulate iron oxide material into the vertical shaft furnace at the top establishes a particulate burden 14 therein. Means for removing reduced product from the bottom of the furnace establishes a gravitational flow of particulate metal oxide material through the shaft furnace. Means for generating a carbon-containing reducing gas consists of a reformer, a gas generator or a $CH_4$ source, etc. Inlet means 34 for introducing the carbon-containing reducing gas into the furnace intermediate the upper and lower zones communicate with the bustle and tuyere system 18, 20. Means for causing the reducing gas to move upwardly and countercurrently through the gravitational flow of metal oxide material are provided causing the reducing gas to react with and reduce a portion of the metal oxide and form a reacted top gas at the upper portion of the furnace. Means for removing the top gas from the upper portion of the furnace 22 are provided, as are means for controlling the contact time of the metal oxide material with the carbon-containing reducing gas. Means for maintaining the temperature of the metal oxide material in the reducing zone from about 649° to about 760° C. (1200° to about 1400° F.) include a gas inlet means 34 and tempering gas line 42 which bypasses the reformer 32 for introducing cooler gas into the hot reformed gas being introduced into the furnace. Alternatively the tempering can be performed by cooler 98 as shown in FIG. 2. The means 16 for removing metallized product from the bottom of the furnace are provided at the bottom of the furnace.

In the apparatus for producing an iron carbide ($Fe_3C$) product from particulate metal oxide material, the means for introducing the carbon-containing reducing gas comprises a bustle 18 having an inlet and at least one tuyere 20 in communication with the bustle and the vertical shaft furnace 10. The apparatus further comprising gas outlet means 28 which facilitates removal of spent cooling gas from the upper part of the lower cooling zone.

In the apparatus for producing an iron carbide ($Fe_3C$) product from particulate metal oxide material, the means for generating a carbon-containing reducing gas comprises a scrubber/cooler 36 in communication with the upper reducing zone of the vertical shaft furnace and a compressor 38 in communication with the scrubber/cooler 36. A reformer furnace 32 having at least one reformer tube 58 is in communication with the compressor 38. At least one burner 33 is provided for heating the reformer furnace 32. A source of hydrocarbons 46 is in communication with the reformer furnace 32 and the bustle 18. A first gas conveying means 64 for conveying gas from the reformer 32 to the vertical shaft furnace 10 and a second means for conveying gas 42 from the compressor to the first gas conveying means. The reformer tube may contain catalyst.

Apparatus for producing an iron carbide ($Fe_3C$) product from particulate metal oxide material, further comprising a source of combustion air (A) in communication with the reformer burner 33.

Apparatus for producing an iron carbide ($Fe_3C$) product from particulate metal oxide material, wherein the source of hydrocarbons 46 is a source of methane.

Apparatus for producing an iron carbide ($Fe_3C$) product from particulate metal oxide material, wherein the means for generating a carbon containing reducing gas further comprises a source of steam (S) in communication with the reformer furnace tube 58.

Apparatus for producing an iron carbide ($Fe_3C$) product from particulate metal oxide material, the means for introducing the cooling gas into the cooling zone of the furnace further comprising a shaft furnace cooling gas outlet 28 at the upper end of the cooling zone and a second scrubber/cooler 24 in communication with the shaft furnace cooling gas outlet 28. A second compressor 62 in communication with the second scrubber/cooler 24 and in communication with the gas inlet 26 to the cooling zone of the vertical shaft furnace.

Apparatus for producing an iron carbide ($Fe_3C$) product from particulate metal oxide material, the means for introducing the cooling gas into the cooling zone of the furnace further comprising a $CO_2$ removal unit 41 in communication with the first compressor 38 and the cooling gas inlet 26 of the shaft furnace 10 and a means of conveying cooled top gas 66 to the second compressor 62. A second source of hydrocarbons 52 communicates with the second compressor 62.

Apparatus for producing an iron carbide ($Fe_3C$) product from particulate metal oxide material, further comprising a gas sensor 48 in communication with the bustle inlet 34 and a programmable controller 60 operably associated with the gas sensor 48. A first valve 68 between the compressor 38 and the reformer furnace 32 operably associated with the programmable controller 60. A fifth valve 70 between the source of hydrocarbons 46 and the burner 33 of the reformer furnace 32 operably associated with the programmable controller 60. A second valve 56 between the source of hydrocarbons and the reformer furnace operably associated with the programmable controller 60. A third valve 72 between the source of hydrocarbons and the vertical shaft furnace operably associated with the programmable controller 60 and a fourth valve 74 between the compressor 38 and the second means for conveying gas 42, operably associated with the programmable controller 60. The programmable controller is adapted to adjust the opening on the first 68, second 56, third 72, fourth 74, and fifth 70 valves according to an output from the applicable sensor. Additionally, for more precise control an additional gas analyzer 76 and thermocouples 78 and 80 can also be operably associated with the programmable controller 60. Note that for the sake of clarity the valves are not shown connected to the programmable controller, however all valves that are operably associated with the programmable controller 60 can be and are connected to the programmable controller 60.

The programmable controller 60 can also monitor and control the input of the cooling gas by having a second gas sensor 50 in communication with the shaft furnace cooling gas outlet 28. A third gas sensor or analyzer 82 is located between the compressor and the $CO_2$ removal unit 41. The programmable controller 60 is operably associated with the second gas sensor 50 and the third gas sensor 82. A first valve 84 is located between the compressor 38 and the $CO_2$ removal unit 41 and is operably associated with the programmable controller 60. A second valve 86 is located between the compressor 38 and the second compressor 62 and is operably associated with the programmable controller 60. A third valve 54 is located between the second source of hydrocarbons 52 and the second compressor 62 and is operably associated with the programmable controller 60. The programmable controller adjusts the opening on the first valve 84, second valve 86, and third valve 54 according to output signals from the sensors 50 and 82. It should be noted that separate thermocouples and gas analyzers could also be used.

Further, alternative apparatus for producing an iron carbide ($Fe_3C$) product from particulate metal oxide material is shown in FIG. 2 where the vertical shaft furnace 10 has a means for introducing the cooling gas 26 near the cooling zone of the furnace and has a first scrubber/cooler 36 in communication with the upper reducing zone 22 of the vertical shaft furnace and a compressor 38 in communication with the scrubber/cooler 36 and in communication with 26 the cooling zone inlet of the vertical shaft furnace. The means for generating a carbon-containing reducing gas further comprises a second scrubber/cooler 24 in communication with the cooling zone outlet 28 of the vertical shaft furnace 10 and a second compressor 62 in communication with the second scrubber/cooler 24. A reformer furnace 32 is in communication with the second compressor 62. The reformer furnace 32 has at least one associated reformer burner 33 and at least one reformer tube 58. A first source of hydrocarbons 46 is in communication with the reformer tube 58. A second source of hydrocarbons 92 is in communication with the reformer burner 33 of the reformer furnace 32. A source of combustion air 94 is in communication with the reformer burner 33. A first means for conveying reducing gas 96 is located between the reformer furnace 32 to the bustle 18 of the vertical shaft furnace 10.

In FIG. 2 the means for generating a carbon-containing reducing gas also comprises a cooler unit 98 in communication with the reformer furnace 32 and the bustle 18 of the vertical shaft furnace 10. A bypass line 100 to the cooler unit allows tempered gas to flow directly into the bustle 18. A third source of hydrocarbons 102 is in communication with the first means for conveying reducing gas 96. This unit can be operated manually or automatically. In either mode a gas sensor 48 is in communication with the first means for conveying reducing gas 96. In the automatic mode, a programmable controller 60 is operably associated with the gas sensor 48. A first valve 104 is located between the second compressor 62 and the reformer furnace 32 and can be operably associated with the programmable controller 60. A second valve 106 between the first source of hydrocarbons and the reformer furnace and can be operably associated with the programmable controller. A third valve 108 located between the second source of hydrocarbons and the burner of the reformer furnace and can be operably associated with the programmable controller 60. A fourth valve 110 is located between the source of combustion air and the burner of the reformer furnace and can be operably associated with the programmable controller 60. The programmable controller 60 is set up to adjust the opening on the first 104, second 106, third 108, and fourth 110 valves according to an input from the sensor 48 in an automatic mode.

In an automatic mode the apparatus of FIG. 2 could also be configured with a gas sensor or analyzer 48 in communication with the first means for conveying reducing gas 96. A programmable controller 60 is operably associated with the gas sensor 48. A thermocouple 112 is also in communication with the first means for conveying reducing gas 96 and is operably associated with the programmable controller 60. A first valve 104 located between the second compressor 62 and the reformer furnace 32 is operably associated with the programmable controller 60. A second valve 106 located between the first source of hydrocarbons 46 and the reformer furnace 32 is operably associated with the programmable controller 60. A third valve 108 located between the second source of hydrocarbons and the burner of the reformer furnace can also be operably associated with the programmable controller 60. A fourth valve 110 located between the source of combustion air 94 and the burner 33 of the reformer furnace 32 can be operably associated with the programmable controller 60. A fifth valve 114 in communication with the bypass line 100 is operably associated with the programmable controller 60. A sixth valve 116 located between the third source of hydrocarbons 102 and the thermocouple 112 is operably associated with the programmable controller 60. During operation the programmable controller 60 is adapted to adjust the opening on the first 104, second 106, fifth 114, and sixth 116 valves according to an output from the sensor 48 and thermocouple 112. Additionally a second thermocouple 118 could be placed in communication with the reformer furnace 32 and control third valve 94 and fourth valve 108.

Note that for the sake of clarity in FIG. 2 the valves are not shown connected to the programmable controller, however all valves that are operably associated with the programmable controller 60 are connected to the programmable controller 60. In FIG. 2 the first source of hydrocarbons, the second source of hydrocarbons and the third source of hydrocarbons can each be a source of methane. Further, FIG. 2 shows a mixing box or chamber 120 in communication with second compressor 62 and first source of hydrocarbons 46. A valve 122 can be located before the input 26 to the vertical shaft furnace 10 to regulate intake of cooled top gas from compressor 38.

Figure 3:
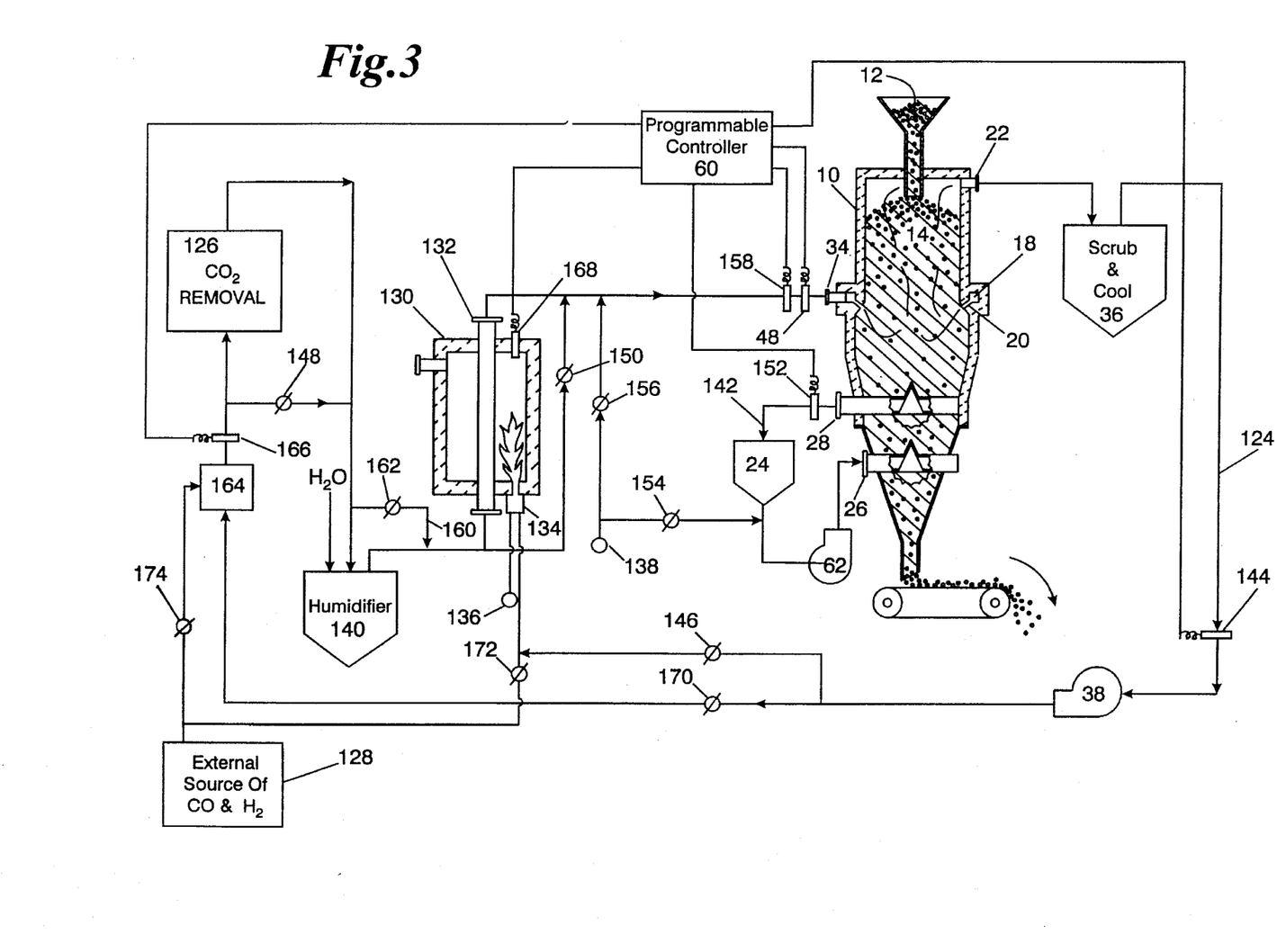
FIG. 3 is a schematic drawing of a vertical shaft furnace and its associated equipment for another alternative method of production of iron carbide in a shaft furnace.

FIG. 3 shows yet another embodiment of the apparatus that can be used to producing an iron carbide ($Fe_3C$) product from particulate metal oxide material. A vertical shaft furnace 10 is in communication with the means for generating a carbon-containing reducing gas. This means for generating a carbon-containing reducing gas comprises a scrubber/cooler 36 in communication with the upper reducing zone 22 of the vertical shaft furnace 10. A compressor 38 is in communication with the scrubber/cooler 36 and a means for conveying gas 124 is connected from the scrubber/cooler 36 to the compressor 38. A $CO_2$ removal unit 126 in communication with the compressor 38. An external source of carbon monoxide (CO) and hydrogen ($H_2$) 128 is in communication with the $CO_2$ removal unit 126. The external source of (CO) and ($H_2$) can be from a coal gasification process or excess off gas from another iron or steel making process. Flow from the external source of carbon monoxide (CO) and hydrogen ($H_2$) may be regulated by valve 174. A gas heater 130 having a heating tube 132 is in communication with the $CO_2$ removal unit 126, and a burner 134 for heating the gas heater 130. The gas heater 130 is in communication with the bustle 18 of the vertical shaft furnace 10. A source of air 136 is in communication with the burner 134 of the gas heater 130. A source of hydrocarbons 138 is in communication with the bustle 18 of the vertical shaft furnace 10.

The scrubber/cooler 36, FIG. 3, can also be in communication with the burner 134 of the gas heater 130 and the external source of carbon monoxide (CO) and hydrogen ($H_2$) 128 (which acts as burner fuel) can be in communication with the burner 134 of the gas heater 130. Valve 172 controls the introduction of burner fuel to the burner 134 responsive to input from thermocouple 168. In this embodiment a humidifier 140 can be in communication with the $CO_2$ removal unit. 126 and the gas heater 130 and the vertical shaft furnace 10.

The means for introducing the cooling gas into the cooling zone of the furnace comprises a second scrubber/cooler 24 in communication with the shaft furnace 10 through spent cooling gas outlet 28. A second compressor 62 is in communication with the second scrubber/cooler 24 and in communication with the cooling gas inlet 26 of the cooling zone of the vertical shaft furnace 10. Means for conducting spent cooling gas 142 is located between the cooling gas outlet 26 and the second scrubber/cooler 24, which is in communication with the second compressor 62 and to the cooling gas inlet 26. The hydrocarbon source 138 is in communication with the second compressor 62. This source of hydrocarbons can be a source of methane.

A first gas sensor or analyzer 48 is located between the gas heater and the vertical shaft furnace in communication with the bustle inlet a second gas sensor 144 is located after the scrubber/cooler 36 in communication with the means for conveying gas 124. A programmable controller 60 can be operably associated with the first gas sensor 48 and the second gas sensor 144. A first valve 146 is located between the scrubber/cooler 36 and the burner 134 of the gas heater 130 and can be operably associated with the programmable controller 60. Flow of cooled top gas to burner 134 can be modulated by valve 170 as easily as with valve 146. A second valve 148 is located between compressor 38 and the gas heater 130 and may be operably associated with the programmable controller 60. A third valve 150 located between the $CO_2$ removal unit and the vertical shaft furnace 10 may be operably associated with the programmable controller 60. The programmable controller is adapted to adjust the opening on the first 146 and second 150 valves according to an output from the sensors 48 and 144.

Alternatively, the first gas sensor 48 located between the gas heater 130 and the vertical shaft furnace 10 in communication with the bustle inlet 34, the second gas sensor 144 located after the scrubber/cooler 36 in communication with the means for conveying gas 124 and a third gas sensor 152 located between the vertical shaft furnace 10 and the second scrubber/cooler 24 in communication with the means for conducting spend cooling gas 142 can all be connected to a programmable controller 60 which is operably associated with the first gas sensor 48, the second gas sensor 144 and the third gas sensor 152. A first valve 146 is located between the scrubber/cooler 36 and the burner 134 of the gas heater 130 and can be operably associated with the programmable controller 60. A second valve 148 is located between compressor 38 and the gas heater 130 and may be operably associated with the programmable controller 60. A third valve 150 may be optionally provided between the $CO_2$ removal unit 126 and the vertical shaft furnace 10, which valve 150 can also be operably associated with the programmable controller 60. A fourth valve 154 located between the source of hydrocarbons 138 and the second compressor 62 can also be operably associated with the programmable controller 60, wherein the programmable controller is adapted to adjust the opening on the first 146, second 148, third 150 and fourth 154 valves according to output from the sensors 48, 144 and 152.

An iron carbide ($Fe_3C$) product is produced in a shaft furnace by the steps of: first, establishing a gravitational flow of particulate iron oxide material by charging a generally vertical shaft furnace having an upper reducing zone and a lower cooling zone with particulate iron oxide material to form a burden therein; second, introducing a reducing gas into the furnace intermediate the upper and lower zones at a temperature sufficient to promote a reducing reaction and a carburizing reaction between the reducing gas and the iron oxide material; third, causing the reducing gas to move upwardly and countercurrently through the gravitational flow of iron oxide material, thereby reacting with and reducing a portion of the iron oxide and forming a reacted top gas at the upper portion of the furnace; fourth, removing the reacted top gas from the upper portion of the furnace; fifth, maintaining the temperature of the iron oxide burden in the reducing zone from about 649° to about 760° C. (about 1200° to about 1400° F.); sixth, maintaining the iron oxide burden within the shaft furnace reducing zone for a residence time of from about 9 to about 15 hours; seventh, introducing a cooling gas into the cooling zone of the furnace; and eighth, removing the resulting iron carbide product from the bottom of the furnace.

Note that for the sake of clarity in FIG. 3 the valves are not shown connected to the programmable controller, however all valves that are operably associated with the programmable controller 60 are connected to the programmable controller 60. In FIG. 3 the source of hydrocarbons can be a source of methane. Further, FIG. 3 includes a mixing box or chamber 164 in communication with the compressor 38 and the external source of carbon monoxide and hydrogen 128.

SUMMARY OF THE ACHIEVEMENT OF THE OBJECTS OF THE INVENTION

From the foregoing, it is readily apparent that we have invented an improved apparatus for iron carbide production in a direct reduction shaft furnace, and a product containing a high percentage of iron carbide. By using this apparatus, iron carbide can be produced faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising;

a scrubber/cooler in communication with said upper reducing zone of said vertical shaft furnace;

a compressor in communication with said scrubber/cooler;

a reformer furnace having at least one reformer tube in communication with said compressor, and at least one burner for heating said reformer furnace;

a source of hydrocarbons in communication with said reformer furnace and said bustle;

a first gas conveying means for conveying gas from said reformer to said vertical shaft furnace; and a second means for conveying gas from said compressor to said first gas conveying means;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) gas inlet means for introducing a cooling gas into said cooling zone of the furnace;

(l) means for removing metallized product from the bottom of the furnace;

(m) a gas sensor in communication with said bustle inlet;

(n) a programmable controller operably associated with said gas sensor;

(o) a first valve between said compressor and said reformer furnace operably associated with said programmable controller;

(p) a second valve between said source of hydrocarbons and said reformer furnace operably associated with said programmable controller;

(q) a third valve between said source of hydrocarbons and said vertical shaft furnace operably associated with said programmable controller; and (r) a fourth valve between said compressor and said second means for conveying gas, operably associated with said programmable controller;

wherein said programmable controller adjusts the opening on said first, said second, said third and said fourth valves according to an output from said sensor.

2. Apparatus for producing an iron carbide ($Fe_3C$) product from particulate iron oxide material according to claim 1 further comprising a source of combustion air in communication with said reformer burner.

3. Apparatus for producing an iron carbide ($Fe_3C$) product from particulate iron oxide material according to claim 1, wherein said source of hydrocarbons is a source of methane.

4. Apparatus for producing an iron carbide ($Fe_3C$) product from particulate iron oxide material according to claim 1, wherein said means for generating a carbon containing reducing gas further comprises a source of steam in communication with said reformer furnace tube.

5. Apparatus for producing an iron carbide ($Fe_3C$) product from particulate iron oxide material according to claim 1, said means for introducing said cooling gas into said cooling zone of the furnace further comprising:

a shaft furnace cooling gas outlet at the upper end of the cooling zone;

a second scrubber/cooler in communication with said shaft furnace cooling gas outlet; and a second compressor in communication with said scrubber/cooler and in communication with said gas inlet to said cooling zone of said vertical shaft furnace.

6. Apparatus for producing an iron carbide ($Fe_3C$) product from particulate iron oxide material according to claim 5, said means for introducing said cooling gas into the cooling zone of the furnace further comprising:

a $CO_2$ removal unit in communication with said first compressor and said cooling gas inlet of said shaft furnace;

a means of conveying cooled top gas to said second compressor; and a second source of hydrocarbons in communication with said second compressor.

7. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising;

a scrubber/cooler in communication with said upper reducing zone of said vertical shaft furnace;

a compressor in communication with said scrubber/cooler;

means for conveying gas from said scrubber/cooler to said compressor;

a $CO_2$ removal unit in communication with said compressor and said vertical shaft furnace;

an external source of carbon monoxide (CO) and hydrogen ($H_2$) in communication with said $CO_2$ removal unit; a gas heater having at least one heating tube in communication with said $CO_2$ removal unit, and a burner for heating said gas heater;

said gas heater in communication with said bustle of said vertical shaft furnace;

a source of air in communication with said burner of said gas heater; and a source of hydrocarbons in communication with said bustle of said vertical shaft furnace;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) gas inlet means for introducing a cooling gas into said cooling zone of the furnace; and (l) means for removing metallized product from the bottom of the furnace.

8. Apparatus for producing an iron carbide ($Fe_3C$) product from particulate iron oxide material according to claim 7, wherein said scrubber/cooler is also in communication with said burner of said gas heater; and said external source of carbon monoxide (CO) and hydrogen ($H_2$) is in communication with said burner of said gas heater.

9. Apparatus for producing an iron carbide ($Fe_3C$) product from particulate iron oxide material according to claim 7, wherein said means for generating a carbon-containing reducing gas further comprises:

a humidifier in communication with said $CO_2$ removal unit, said gas heater and said vertical shaft furnace.

10. Apparatus for producing an iron carbide ($Fe_3C$) product from particulate iron oxide material according to claim 8, said means for introducing said cooling gas into the cooling zone of the furnace further comprising:

a second scrubber/cooler in communication with said shaft furnace spend cooling gas outlet;

a second compressor in communication with said second scrubber/cooler and in communication with said cooling gas inlet of said cooling zone of said vertical shaft furnace;

means for conducting spent cooling gas from said cooling gas outlet through said second scrubber/cooler, said second compressor, and to said cooling gas inlet; and said hydrocarbon source in communication with said second compressor.

11. Apparatus for producing an iron carbide ($Fe_3C$) product from particulate iron oxide material according to claim 7, wherein said source of hydrocarbons is a source of methane.

12. Apparatus for producing an iron carbide ($Fe_3C$) product from particulate iron oxide material according to claim 7, further comprising:

a first gas sensor located between said gas heater and said vertical shaft furnace in communication with said bustle inlet;

a second gas sensor located between said scrubber/cooler and said compressor;

a programmable controller operably associated with said first gas sensor and said second gas sensor;

a first valve between said scrubber/cooler and said burner of said gas heater operably associated with said programmable controller;

a second valve between said first source of hydrocarbons and said gas heater operably associated with said programmable controller; and a third valve between the inlet of said $CO_2$ removal unit and said heater operably associated with said programmable controller;

wherein said programmable controller is adapted to adjust the opening on said first, said second and said third valves according to an output from said sensors.

13. Apparatus for producing an iron carbide ($Fe_3C$) product from particulate iron oxide material according to claim 10, further comprising:

a first gas sensor located between said gas heater and said vertical shaft furnace in communication with said bustle inlet;

a second gas sensor located after said scrubber/cooler in communication with said means for conveying gas;

a third gas sensor located between said vertical shaft furnace and said second scrubber/cooler in communication with said means for conducting spend cooling gas;

a programmable controller operably associated with said first gas sensor, said second gas sensor and said third gas sensor;

a first valve between said scrubber/cooler and said burner of said gas heater operably associated with said programmable controller;

a second valve between said source of hydrocarbons and said gas heater operably associated with said programmable controller;

a third valve between the inlet of said $CO_2$ removal unit and said heater operably associated with said programmable controller; and a fourth valve between said source of hydrocarbons and said second compressor operably associated with said programmable controller;

wherein said programmable controller is adapted to adjust the opening on said first, said second, said third and said fourth valves according to output from said sensors.

14. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising;
a scrubber/cooler in communication with said upper reducing zone of said vertical shaft furnace;
a compressor in communication with said scrubber/cooler;
a reformer furnace having at least one reformer tube in communication with said compressor, and at least one burner for heating said reformer furnace;
a source of hydrocarbons in communication with said reformer furnace and said bustle;
a first gas conveying means for conveying gas from said reformer to said vertical shaft furnace; and
a second means for conveying gas from said compressor to said first gas conveying means;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) means for introducing a cooling gas into said cooling zone of the furnace, comprising:
a shaft furnace cooling gas outlet at the upper end of the cooling zone;
a second scrubber/cooler in communication with said shaft furnace cooling gas outlet;
a second compressor in communication with said scrubber/cooler and in communication with said gas inlet to said cooling zone of said vertical shaft furnace;
a $CO_2$ removal unit in communication with said first compressor and said cooling gas inlet of said shaft furnace;
a means of conveying cooled top gas to said second compressor; and
a second source of hydrocarbons in communication with said second compressor;

(l) means for removing metallized product from the bottom of the furnace;

(m) a second gas sensor in communication with said shaft furnace cooling gas outlet;

(n) a third gas sensor between said compressor and said $CO_2$ removal unit;

(o) a programmable controller operably associated with said second gas sensor and said third gas sensor;

(p) a first valve between said compressor and said $CO_2$ removal unit operably associated with said programmable controller;

(q) a second valve between said compressor and said second compressor operably associated with said programmable controller; and (r) a third valve between said second source of hydrocarbons and said compressor operably associated with said programmable controller;

wherein said programmable controller adjusts the opening on said first, second, and third valves according to an output from said sensors.

15. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising:
a second scrubber/cooler in communication with said cooling zone of said vertical shaft furnace;
a second compressor in communication with said second scrubber/cooler;
a reformer furnace in communication with said compressor, said furnace having at least one associated reformer burner;
a first source of hydrocarbons in communication with said reformer furnace;
a second source of hydrocarbons in communication with said reformer burner of said reformer furnace;
a source of combustion air in communication with said reformer burner; and
a first means for conveying reducing gas from said reformer furnace to said bustle of said vertical shaft furnace;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) means for introducing a cooling gas into said cooling zone of the furnace, comprising:
a first scrubber/cooler in communication with said upper reducing zone of said vertical shaft furnace; and
a compressor in communication with said scrubber/cooler and in communication with said cooling zone of said vertical shaft furnace;

(l) means for removing metallized product from the bottom of the furnace;

(m) a gas sensor in communication with said first means for conveying reducing gas;

(n) a programmable controller operably associated with said gas sensor;

(o) a first valve between said second compressor and said reformer furnace operably associated with said programmable controller; and (p) a second valve between said first source of hydrocarbons and said reformer furnace operably associated with said programmable controller;

wherein said programmable controller is adapted to adjust the opening on said first and second valves according to an output from said sensor.

16. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising:
a second scrubber/cooler in communication with said cooling zone of said vertical shaft furnace;
a second compressor in communication with said second scrubber/cooler;
a reformer furnace in communication with said compressor, said furnace having at least one associated reformer burner;
a first source of hydrocarbons in communication with said reformer furnace;
a second source of hydrocarbons in communication with said reformer burner of said reformer furnace;
a source of combustion air in communication with said reformer burner; and
a first means for conveying reducing gas from said reformer furnace to said bustle of said vertical shaft furnace;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone; a cooler unit in communication with said reformer furnace and said bustle of said vertical shaft furnace; a bypass line to said cooler unit; and a third source of hydrocarbons communicating with said first means for conveying reducing gas from said reformer furnace to said bustle;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) means for introducing a cooling gas into said cooling zone of the furnace, comprising:
   a first scrubber/cooler in communication with said upper reducing zone of said vertical shaft furnace; and
   a compressor in communication with said scrubber/cooler and in communication with said cooling zone of said vertical shaft furnace;

(l) means for removing metallized product from the bottom of the furnace;

(m) a gas sensor in communication with said first means for conveying reducing gas;

(n) a programmable controller operably associated with said gas sensor;

(o) a thermocouple in communication with said first means for conveying reducing gas and operably associated with said programmable controller;

(p) a first valve between said second compressor and said reformer furnace operably associated with said programmable controller;

(q) a second valve between said first source of hydrocarbons and said reformer furnace operably associated with said programmable controller;

(r) a third valve in communication with said bypass line and operably associated with said programmable controller; and (s) a fourth valve between said third source of hydrocarbons and said thermocouple operably associated with said programmable controller;

wherein said programmable controller is adapted to adjust the opening on said first, said second, said third, and said fourth valves according to an output from said sensor.

17. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising;
   a second scrubber/cooler in communication with said cooling zone of said vertical shaft furnace;
   a second compressor in communication with said second scrubber/cooler;
   a reformer furnace in communication with said compressor, said furnace having at least one associated reformer burner;
   a first source of methane in communication with said reformer furnace;
   a second source of methane in communication with said reformer burner of said reformer furnace;
   a source of combustion air in communication with said reformer burner; and
   a first means for conveying reducing gas from said reformer furnace to said bustle of said vertical shaft furnace;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) means for introducing a cooling gas into said cooling zone of the furnace, comprising:
   a first scrubber/cooler in communication with said upper reducing zone of said vertical shaft furnace; and
   a compressor in communication with said scrubber/cooler and in communication with said cooling zone of said vertical shaft furnace; and (l) means for removing metallized product from the bottom of the furnace.

18. Apparatus for producing an iron carbide ($Fe_3C$) product from particulate iron oxide material, comprising:

(a) a generally vertical shaft furnace having an upper reducing zone and a lower cooling zone;

(b) means for charging particulate iron oxide material into said vertical shaft furnace and establishing a particulate burden therein;

(c) means for establishing a gravitational flow of particulate iron oxide material through said shaft furnace;

(d) means for generating a carbon-containing reducing gas, comprising;
   a second scrubber/cooler in communication with said cooling zone of said vertical shaft furnace;
   a second compressor in communication with said second scrubber/cooler;
   a reformer furnace in communication with said compressor, said furnace having at least one associated reformer burner;
   a first source of hydrocarbons in communication with said reformer furnace;
   a second source of hydrocarbons in communication with said reformer burner of said reformer furnace;
   a source of combustion air in communication with said reformer burner; and
   a first means for conveying reducing gas from said reformer furnace to said bustle of said vertical shaft furnace;

(e) means for introducing said carbon-containing reducing gas into said furnace intermediate the upper and lower zones, comprising a bustle having an inlet and at least one tuyere in communication with said bustle and said vertical shaft furnace;

(f) gas outlet means for removing spent cooling gas from the upper part of said lower cooling zone; a cooler unit in communication with said reformer furnace and said bustle of said vertical shaft furnace; a bypass line to said cooler unit; and a source of methane communicating with said first means for conveying reducing gas from said reformer furnace to said bustle;

(g) means for causing said reducing gas to move upwardly and countercurrently through the gravitational flow of iron oxide material and to react with and reduce a portion of the iron oxide and form a top gas at the upper portion of the furnace;

(h) means for removing said top gas from the upper portion of the furnace;

(i) means for controlling the contact time of said iron oxide material with said carbon-containing reducing gas;

(j) means for maintaining the temperature of the iron oxide material in the reducing zone from about 649° to about 760° C. (1200° to about 1400° F.);

(k) means for introducing a cooling gas into said cooling zone of the furnace, comprising:
 a first scrubber/cooler in communication with said upper reducing zone of said vertical shaft furnace; and
 a compressor in communication with said scrubber/cooler and in communication with said cooling zone of said vertical shaft furnace; and (l) means for removing metallized product from the bottom of the furnace.

* * * * *